(12) United States Patent
Sun

(10) Patent No.: US 9,413,664 B1
(45) Date of Patent: **\*Aug. 9, 2016**

(54) RESUMING MEDIA OBJECTS DELIVERED VIA STREAMING SERVICES UPON DATA LOSS EVENTS

(75) Inventor: Yaojun Sun, South Riding, VA (US)

(73) Assignee: Spring Communications Company L.P., Overland Park, KS (US)

( \* ) Notice: Subject to any disclaimer, the term of this patent is extended or adjusted under 35 U.S.C. 154(b) by 1317 days.

This patent is subject to a terminal disclaimer.

(21) Appl. No.: 12/235,792

(22) Filed: Sep. 23, 2008

(51) Int. Cl.
*G06F 13/00* (2006.01)
*H04L 12/801* (2013.01)
*H04L 12/891* (2013.01)
*G06F 11/34* (2006.01)

(52) U.S. Cl.
CPC ............... *H04L 47/10* (2013.01); *H04L 47/41* (2013.01); *G06F 11/3466* (2013.01)

(58) Field of Classification Search
CPC ... G06F 3/0484; G06F 9/4443; G06F 9/4445; H04L 29/06; H04L 67/38; H04L 41/509
USPC .......... 715/716; 710/15, 29, 30, 33; 707/238; 709/217; 345/240.01, E7.001
See application file for complete search history.

(56) References Cited

U.S. PATENT DOCUMENTS

| | | | |
|---|---|---|---|
| 5,925,102 A | 7/1999 | Eilert et al. | |
| 6,477,542 B1 | 11/2002 | Papaioannou | |
| 6,973,667 B2 * | 12/2005 | Fritsch | 725/88 |
| 6,996,129 B2 * | 2/2006 | Krause et al. | 370/487 |
| 7,064,657 B2 | 6/2006 | Becker et al. | |
| 7,116,714 B2 | 10/2006 | Hannuksela | |
| 7,139,813 B1 * | 11/2006 | Wallenius | 709/219 |
| 7,191,233 B2 | 3/2007 | Miller | |
| 7,206,559 B2 | 4/2007 | Meade, II | |
| 7,804,856 B2 * | 9/2010 | Krause et al. | 370/486 |
| 7,889,697 B2 | 2/2011 | Chen et al. | |
| 8,032,671 B1 | 10/2011 | Sun | |
| 2002/0083438 A1 * | 6/2002 | So et al. | 725/31 |
| 2002/0118671 A1 | 8/2002 | Staples et al. | |
| 2003/0128664 A1 | 7/2003 | Connor | |
| 2003/0152044 A1 | 8/2003 | Turner | |
| 2004/0176157 A1 | 9/2004 | Walker et al. | |

(Continued)

OTHER PUBLICATIONS

1-Mo. OA, mailed Jul. 26, 2011, in U.S. Appl. No. 12/363,702, 15 pp.

(Continued)

*Primary Examiner* — Jeffrey A Gaffin
*Assistant Examiner* — Rinna Yi

(57) ABSTRACT

Systems, methods, and computer-readable media for resuming a media object presented on a device following a data loss event that interrupts the presentation of the media object, wherein streaming services are used to deliver the media object are provided. A physical disconnection that occurs at a point during the presentation of the media object is recognized. The physical disconnection is recognized based on an identification that media data has not been received by the device within a predetermined time period. Upon recognition of the physical disconnection, the presentation of the media object is automatically paused. After detecting reestablishment of a physical connection, the media object is resumed as though no interruption occurred. A resume request is communicated to a streaming control agent to provide an indication that the streaming control agent should continue delivering media data to the device.

20 Claims, 5 Drawing Sheets

(56) References Cited

U.S. PATENT DOCUMENTS

| | | | |
|---|---|---|---|
| 2006/0015580 A1* | 1/2006 | Gabriel et al. | 709/219 |
| 2006/0089843 A1* | 4/2006 | Flather | 705/1 |
| 2006/0263048 A1 | 11/2006 | Sato et al. | |
| 2007/0058534 A1 | 3/2007 | Shimonishi et al. | |
| 2008/0152322 A1* | 6/2008 | Onoda | 386/126 |
| 2008/0162666 A1* | 7/2008 | Ebihara et al. | 709/217 |
| 2008/0183857 A1* | 7/2008 | Barfield | H04L 12/66 709/224 |
| 2008/0195664 A1 | 8/2008 | Maharajh et al. | |
| 2008/0310439 A1 | 12/2008 | Gale et al. | |
| 2009/0103565 A1 | 4/2009 | Matsui | |
| 2009/0142034 A1* | 6/2009 | Sotomaru | 386/83 |
| 2010/0115568 A1* | 5/2010 | Gupta et al. | 725/106 |
| 2010/0121891 A1 | 5/2010 | Zampiello | |
| 2011/0197057 A1 | 8/2011 | Koch | |
| 2011/0239024 A1 | 9/2011 | Hsieh et al. | |

OTHER PUBLICATIONS

Notice of Allowance, mailed May 17, 2011, in U.S. Appl. No. 12/977,171, 6 pages.

1st Office Action, mailed Nov. 28, 2011, in U.S. Appl. No. 12/363,702, 10 pp.

Non Final OA mailed Feb. 16, 2011 in U.S. Appl. No. 12/977,171, 9 pp.

Office Action, mailed Mar. 31, 2010, in U.S. Appl. No. 12/114,534, 11 pages.

Notice of Allowance, mailed Sep. 9, 2010, in U.S. Appl. No. 12/114,534, 6 pages.

Pre-Interview Communication, mailed Dec. 28, 2011, in U.S. Appl. No. 12/323,263, 13 pp.

First Action Interview, Office Action Summary, mailed May 30, 2012, in U.S. Appl. No. 12/323,263, 11 pp.

Notice of Allowance, mailed Dec. 3, 2012, in U.S. Appl. No. 12/323,263, 25 pp.

Final Office Action, mailed Jan. 11, 2013, in U.S. Appl. No. 12/363,702, 34 pp.

Non-Final Office Action mailed Dec. 4, 2013 in U.S. Appl. No. 12/363,702, 20 pages.

Final Office Action mailed Jul. 10, 2014 in U.S. Appl. No. 12/363,702, 20 pages.

Notice of Allowance dated Mar. 31, 2015 in U.S. Appl. No. 12/363,702, 16 pages.

* cited by examiner

RESUMING MEDIA OBJECTS DELIVERED VIA STREAMING SERVICES UPON DATA LOSS EVENTS

SUMMARY

This Summary is provided to introduce a selection of concepts in a simplified form that are further described below in the Detailed Description. Embodiments of the present invention are defined by the claims below. This Summary is intended to summarize embodiments of the invention and is not intended to limit the scope of the claims in any way.

In embodiments, one or more computer-readable media having computer-executable instructions embodied thereon that, when executed, perform a method for resuming a media object presented on a device following a data loss event that interrupts the presentation of the media object is provided. The media data associated with the media object is delivered to a device via a streaming service. The media object is presented using media data received by the device. A physical disconnection that occurs at a point during the presentation of the media object is recognized. Such a recognition can occur based on an identification that media data associated has not been received by the device within a predetermined time period. The presentation of the media object is automatically paused. Thereafter, the presentation of the media object is resumed at substantially the same point the media object was interrupted as though no interruption occurred upon recognition of a reestablishment of a physical connection. A resume request is communicated to a streaming control agent, the resume request includes an indication of the media data at which the streaming control agent should begin delivering the media data to the device.

In other embodiments, one or more computer-readable media having computer-executable instructions embodied thereon that, when executed, perform a method for resuming a media object presented on a portable device following a data loss event that interrupts the presentation of the media object is provided. The media object is delivered to the portable device from a streaming control agent via a streaming service. A first connection signal is received from the portable device. The first connection signal is transmitted from the portable device upon the lapse of a predetermined time period. The first connection signal provides an indication that communication means exist between the portable device and the streaming control agent. A first media data associated with the media object is delivered to the portable device. A copy of the first media data is stored in a storage queue of a streaming control agent. It is recognized that a second connection signal is not received within a predetermined time period. Thereafter, delivery of the media object to the portable device is paused. An indication to resume delivery of the media object to the portable device is recognized. A second media data associated with the media object is communicated to the portable device, a copy of the second media data being stored in the storage queue of the streaming control agent.

In still further embodiments, a set of computer-useable instructions provide a method for resuming a media object presented on a wireless device following a data loss event that interrupts the presentation of the media object is provided. The media object is delivered to a wireless device via a streaming service from a streaming control agent. A first set of media packets containing media data is communicated to the wireless device. A failed connection between the wireless device and the streaming control agent is recognized. The failed connection is recognized upon the lapse of a predetermined time period during which a connection signal transmitted from the wireless device is not received by the streaming control agent. Based on the recognized connection failure, delivery of a second set of media packets containing media data is paused. The second set of media packets, or a portion thereof, is stored within a storage queue of the streaming control agent. An indication that a connection between the wireless device and the streaming control agent has been reestablished is received. The indication of the established connection might comprise a resume request communicated by the wireless device in accordance with a user selection to resume the media object. Based on the indication of the established connection, the second set of the media packets is communicated to the device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
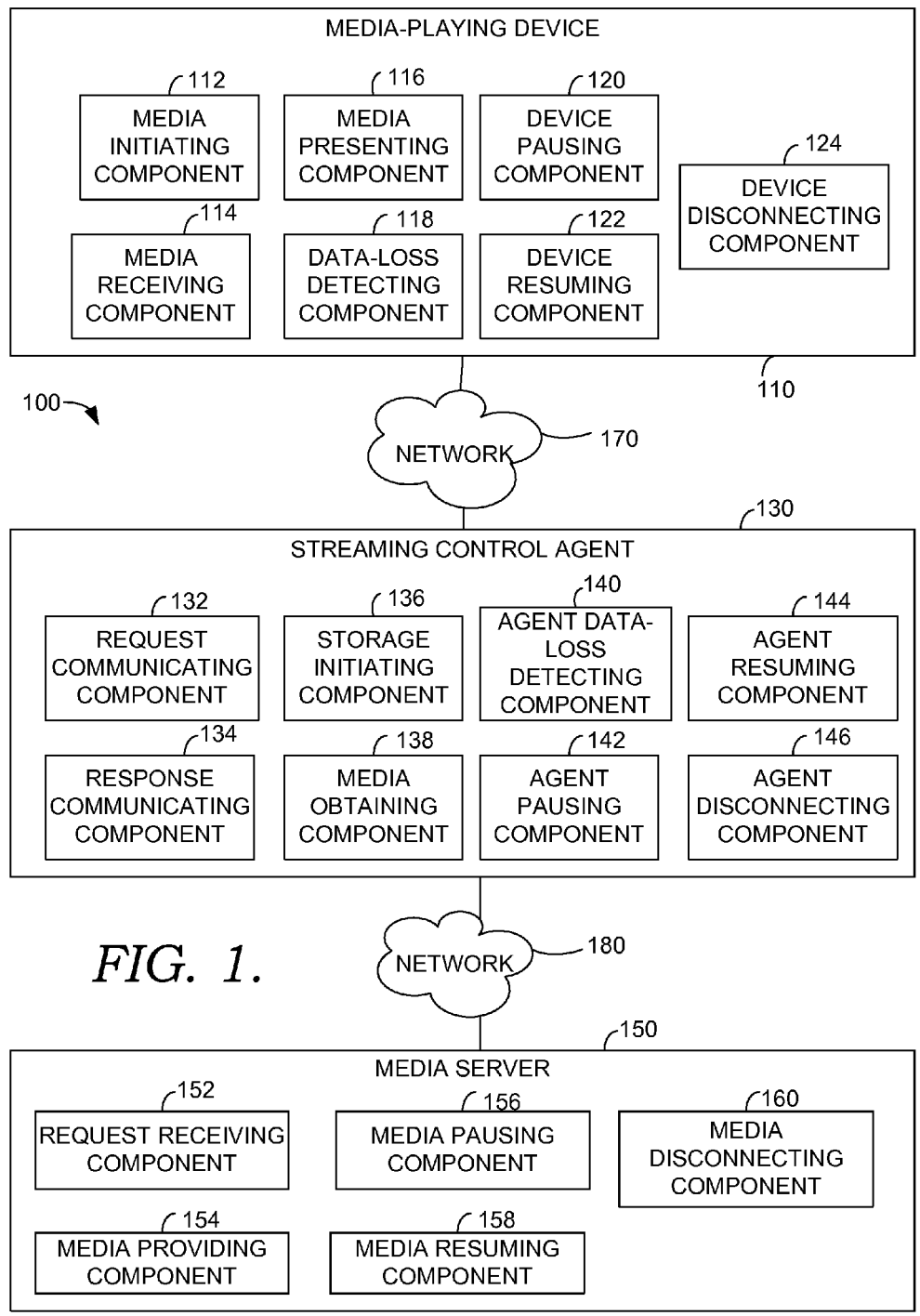
FIG. 1 is a block diagram of an exemplary computing system for resuming media objects upon data loss events, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
DAP Digital Audio Player
DVD Digital Versatile Discs EEPROM Electrically Erasable Programmable Read Only Memory
FIFO First In, First Out
IP Internet Protocol
LIFO Last In, First Out
MP3 MPEG-1 Audio Layer 3
PC Personal Computer
PDA Personal Digital Assistant
PMP Portable Media Player
PVP Portable Video Player
RAM Random Access Memory
ROM Read Only Memory
WiMAX Worldwide Interoperability for Microwave Access As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention relate to systems, methods, and computer-readable media for resuming media objects upon data loss events that interrupt the presentation of the media objects, wherein streaming services are utilized to deliver the media objects to devices presenting the media objects. A media object, as used herein, refers to any media content including, but not limited to, videos, songs, movies, games, and/or any other type of media content, or portions thereof. As such, a media object can be, for example, an audio media object, a video media object, a combination thereof, or the like.

Streaming services can be utilized to deliver media objects to a device, such as a mobile phone. A streaming service, as used herein, refers to a particular method used to deliver a media object from a media server to a device over a network, such as the Internet. With streaming services, a media object begins playing upon the device receiving a small amount of media data (i.e. data associated with a media object). The media data received by the device is stored in a buffer or memory. As such, in embodiments, the media data is not stored permanently in the device hardware. Throughout a media session, the device continues to receive media data in advance of being output by the device. A media session, as used herein, refers to a period of time measured from beginning to end of a streaming service being provided to a device. That is, a media session might begin with a device initiating a streaming service so that the device receives and presents a media object, and such a media session might end when the device, streaming control agent, and/or media server are disconnected from one another upon completing the transmission of the media object to the device.

A media server, as used herein, refers to a server or other computing device that provides or delivers media objects. In embodiments, a media server stores media objects. In such a case, media objects are available to be transmitted in accordance with a user's request or an automatically generated request. A media server might be an operator streaming server or an Internet streaming server. An operator streaming server refers to a media server hosted by a telecommunications network provider, such as, for example, Sprint® or AT&T®, that utilizes the telecommunications network of the host or other telecommunications network(s) to deliver media. An Internet streaming server is a media server that utilizes the Internet to deliver media. Such an Internet streaming server might be hosted by any entity.

While a media object is being presented (e.g., audio and/or video playback) via a device, data loss events oftentimes occur. A data loss event, as used herein, refers to a loss of data (e.g., voice packets or data packets) during or prior to transmission to a device. In embodiments, a data loss event comprises a loss of a physical connection (i.e., a physical disconnection). That is, the physical layer of data connections might be disrupted or lost. In wireless environments (e.g., 3G or 4G), data connections, such as Internet Protocol (IP) connections, are oftentimes disrupted due to wireless radio conditions and other services (e.g., voice and push-to-talk). Due to a lack of radio coverage and/or radio condition changes, a physical connection can be lost (i.e., a data loss event can occur). For example, in instances where a mobile device is in an elevator, a radio signal might not be able to operate through a metal shield of the elevator walls and, as such, the mobile device can lose connectivity with the mobile base station. By way of further example, variations in mobile data rate might occur due to actual radio conditions for CDMA or WiMAX technologies.

Such data loss events oftentimes interrupt the presentation of a media object. That is, in instances where a streaming service is utilized to deliver a media object to a device, the occurrence of a data loss event can interrupt the presentation of the media object. By way of example only, assume a media server is delivering a media object to a device for audio and/or video playback to a user. Upon a data loss event, the media server might continue sending data packets to the device, but such packets might not be received by the device. As such, the packets are lost and the presentation interrupted.

As previously set forth, embodiments of the present invention relate to systems, methods, and computer-readable media for resuming media objects upon data loss events that interrupt the presentation of the media objects, wherein streaming services are utilized to deliver the media objects to the devices presenting the media objects. By way of example only, assume that a portion of a media object is delivered to a device via streaming services and, as such, the device begins to present the media object. Further assume that a data loss event occurs, such as a physical disconnection, and interrupts the playback of the media object. Accordingly, the reception of media data associated with the media object is disrupted. Embodiments of the present invention enable the resumption of the presentation of the media object at substantially the same position at a later instance as though no interruption (e.g., data loss event) occurred. That is, upon a data loss event, a media object can be presented at the point it was interrupted when the data loss occurred. As such, a user experience can continue without having to initiate a new streaming service session of the media object from the beginning.

Referring to the drawings generally, and initially to FIG. 1 in particular, an exemplary computing system 100 for practicing an embodiment of the present invention is provided. It will be understood and appreciated by those of ordinary skill in the art that the computing system 100 shown in FIG. 1 is merely an example of one suitable computing system and is not intended to suggest any limitation as to the scope of use or functionality of the present invention. Neither should the computing system 100 be interpreted as having any dependency or requirement related to any single component or combination of components illustrated therein. The single unit depictions are meant for clarity, not to limit the scope of embodiments in any form.

As shown in FIG. 1, an exemplary computing system 100 includes a media-playing device 110, a streaming control agent 130, and a media server 150. Media-playing device 110, streaming control agent 130, and media server 150 are capable of communicating via a communications network, such as network 170 and network 180. Network 170 and network 180 might comprise, for example, cable networks, the Internet, wireless networks, or a combination thereof or portions thereof. In embodiments, network 170 and/or network 180 include an array of devices, which are not shown so as to not obscure more relevant aspects of the invention. Components such as a base station, a communications tower, or even access points (as well as other components) can provide wireless connectivity in some embodiments. Communications network 170 and network 180 may be combined into a single network or can include multiple networks, as well as being a network of networks, but is shown in more simple form so as to not obscure other aspects of the present invention.

Network 170 enables communication between media-playing device 110 and streaming control agent 130. In one embodiment, network 170 comprises a wireless telecommunications network provided by a telecommunications network provider, such as, for example, Sprint®, AT&T®, etc. Network 180 enables communication between streaming control agent 130 and media server 150. In one embodiment, network 180 comprises a wireless network or a physically wired network, such as a landline, Ethernet, or the like. Such a physically wired network utilized for communication between the streaming control agent 130 and the media server 150 reduces the likelihood of physical disconnections and other data loss events between the media server 150 and the streaming control agent 130, thereby, enhancing user experience. One skilled in the art will appreciate that as the media server 150 can be an Internet media server that provides media objects via the Internet, network 180 might comprise the Internet. Alternatively, as the media server 150 can be an operator streaming server, network 180 might comprise a telecommunications network hosted by a telecommunications network provider. In such an embodiment, network 170 and network 180 can be provided by the same telecommunications network provider or different telecommunications network providers.

Communications between components (e.g., devices, streaming control agents, and media servers) can be provided using any protocol, such as, for example, RTSP, HTTP, and/or any streaming protocol. For example, in one embodiment, communications between the media playing device 110 and the streaming control agent 130 might use a streaming protocol while communications between streaming control agent 130 and the media server 150 might use RTSP/HTTP. Although single components are illustrated for clarity, one skilled in the art will appreciate that network 170 can enable communication between multiple devices and/or multiple media proxies, and network 180 can enable communication between multiple media proxies and/or multiple media servers.

The media-playing device 110 is utilized to request media objects and to present the requested media objects to a user. As used herein, the phrase "media-playing device" refers to any electronic device capable of presenting media objects. As such, media-playing device 110 may take on a variety of forms, such as a personal computer (PC), a laptop computer, a mobile phone, a personal digital assistant (PDA), a portable media player (PMP), or any other device that is capable of presenting media objects as described herein. A portable media player (PMP) device may include, without limitation, a portable video player (PVP) and/or a digital audio player (DAP), such as a MP3 player. Accordingly, a media-playing device 110 that is capable of presenting media objects may be variously referred to herein as a device, a client device, a media device, a portable media device, a portable media player, a media player, and the like. Makers of illustrative media-playing devices include, for example, Research in Motion, Creative Technologies Corp., Samsung, Apple Computer, and the like. A media-playing device can include, for example, a display(s), a power source(s) (e.g., a battery), a data store(s), a speaker(s), memory, a buffer(s), and the like. In embodiments, a media-playing device comprises a wireless or mobile media-playing device.

In one embodiment, the media-playing device 110 includes a media initiating component 112, a media receiving component 114, a media presenting component 116, a data-loss detecting component 118, a device pausing component 120, a device resuming component 122, and a device disconnecting component 124. In some embodiments, one or more of the illustrated components may be implemented as stand-alone applications. In other embodiments, one or more of the illustrated components may be integrated directly into the operating system of the media-playing device 110. It will be understood by those of ordinary skill in the art that the components illustrated in FIG. 1 are exemplary in nature and in number and should not be construed as limiting. Any number of components may be employed to achieve the desired functionality within the scope of embodiments hereof.

The media initiating component 112 is configured to initiate a streaming service session to receive and/or present a media object. That is, the media initiating component 112 initiates the reception and/or presentation of a media object by requesting such a media object be delivered via a streaming service. By way of example, media initiating component 112 might generate and/or communicate a media request. A media request refers to a data packet that includes a request for a media object, for example, to be received and/or presented. In one embodiment, such a media request is communicated to the streaming control agent 130 via network 170.

In one implementation, the media request might include a streaming service instruction and a media object identifier to identify the media object desired to be received and/or presented. A streaming service instruction provides an indication of initiation of a streaming service. A media object identifier refers to any identifier that identifies a particular media object. Such a media object identifier can be utilized to reference or obtain the desired media object. A media object identifier may comprise, for example, a number, a track title, a container label, a track icon, an artist, a symbol, an image, a link, or any other feature that can identify a media object.

In embodiments, the media initiating component 112 might be configured to initiate a streaming service session upon detecting an indication to initiate the presentation and/or reception of a media object. In one embodiment, an indication to initiate a presentation or reception of a media object is provided by a user. In such an embodiment, a user may navigate to a desired media object identifier. Upon navigating to the desired media object identifier, the user can provide an indication to initiate the presentation and/or reception of the media object. For example, a user can navigate to "Video 1" and provide an indication to play "Video 1." A user-provided indication to initiate a presentation and/or reception of a media object might include a user's selection of a media object identifier associated with the media object desired for presentation. In such a case, a user can select a media object identifier by, for example, double-clicking on a media object identifier, right-clicking on a media object identifier, hovering over a media object identifier, dragging and dropping a media object identifier, providing an audio command, selecting a media object identifier via a touch screen, or the like.

Media initiating component 112 might be configured to detect an indication to initiate a media object upon attaining a certain threshold and/or parameter. For example, assume that hovering over a media identifier provides an indication to initiate the presentation of a media object. In such a case, media initiating component 112 can detect the indication after a media object identifier is hovered over, for example, for two seconds. Such thresholds and parameters might provide a more user-friendly user interface.

In an alternative embodiment, an indication to initiate the presentation and/or reception of a media object may be automatically provided. In such an embodiment, an indication to initiate the presentation of a media object may be automatically provided based on the occurrence of an event. Such an event may include, for example, initiating a media player or a media browser, navigating to a website, or the like.

The media receiving component 114 is configured to receive communications from the streaming control agent 130, the media server 150, or a combination thereof. Such communications include, for example, media responses and media data. A media response, as used herein, refers to a packet communicated in response to a media request that indicates a receipt or confirmation of the media request. Media data, as used herein, refers to a packet having media content (e.g., a media object, or a portion thereof). The media data enables the presentation of a media object on a device. In embodiments, the media data received by a media-playing device 110 might be stored (e.g., temporarily or momentarily) in a buffer or memory of the media-playing device 110.

The media presenting component 116 is configured to present or output (e.g. audio or video playback) the media object, or portions thereof. In some embodiments, the media presenting component 116 utilizes a display screen associated with (e.g., coupled with) the media-playing device, an audio system associated with the media-playing device, or a combination thereof. The media presenting component 116 might present the media object as the media packets are received or upon the device receiving a particular amount of media data buffered on the device.

The data-loss detecting component 118 is configured to detect data loss events. In one embodiment, the data-loss detecting component 118 detects a data loss event if a media data packet has not been received by the media-playing device within a particular data-loss time period. A data-loss time period, as used herein, refers to any amount of time used to detect data loss events. A data-loss time period might be based on a clock time, a time duration, or any other measurement of time. By way of example only, assume a data-loss detecting component 118 detects a data loss event if a media data packet is not received within a time period of ten seconds. Further assume that ten seconds has lapsed since the data-loss detecting component 118 last received a media data packet. In such a case, a data loss event is detected.

To detect data loss events, the data-loss detecting component 118 might obtain the latest or most recently received media packet(s), or information associated therewith. As such, the data-loss detecting component 118, or another component, might temporarily or momentarily store such media packet(s) or information contained within or associated with the media packets (e.g., time media packet received, media packet number or other identifier, or the like). The data-loss detecting component 118 might be configured to recognize and/or store an indication (e.g., media packet identifier, time media packet received, etc.) of the last media packet received prior to the data loss event so that the media object can be resumed at substantially the same point it was interrupted. Using the latest or most recently received media packet, or information associated therewith, and a data-loss time period, data loss events can be detected.

In some implementations, the data-loss detecting component 118, or another component, is additionally or alternatively configured to communicate a connection signal indicating that the media-playing device 110 is normally operating. In embodiments, a connection signal is transmitted from the media-playing device 110 to the streaming control agent 130 upon the expiration of a particular connection time period. A connection time period, as used herein, refers to any amount of time used in transmitting connection signals. A connection time period might be based on a clock time, a time duration, or any other measurement of time. One skilled in the art will appreciate that a data-loss time period used by the device to detect data loss events might equal a connection time period used to transmit connection signals. By way of example only, assume a media-playing device 110 utilizes a connection time period of ten seconds. Upon the lapse of the ten second connection time period, the media-playing device 110 transmits a connection signal to the streaming control agent 130.

One skilled in the art will appreciate that, in some embodiments, connection signals are transmitted by the media-playing device only in instances when the media-playing device is properly connected (e.g., physically connected) with the streaming control agent, the media server, or the like. As such, upon a data loss event, the media-playing device discontinues transmitting connection signals until the data loss event is concluded. In other embodiments, connection signals are transmitted in any instance in which the media-playing device is capable of transmitting a signal. In such a case, even though connection signals are generally transmitted from the media-playing device, the streaming control agent only receives such a connection signal when the media-playing device and streaming control agent are properly connected so that communication between devices can be completed.

The device pausing component 120 is configured to pause or initiate a pause of the media object being presented on media-playing device 110. In embodiments, the device pausing component 120 automatically pauses or initiates a pause of the presentation of the media object in response to a detection of a data loss event. Initiating a pause of presenting the media object might occur using a pause presenting indicator. A pause presenting indicator provides an indication to a media-playing device, or a component thereof, to pause the presentation of the media object being presented. By way of example only, upon detecting a data loss event, the device pausing component 120 automatically communicates a pause presenting indicator to the media presenting component 116 or other application associated with presenting the media object. The pause presenting indicator can be communicated upon detection of the data loss event or upon the completion of presenting all media data received by the media-player device. For instance, assume that upon detecting a lost physical connection, the device pausing component 120 communicates a pause presenting indicator to the media presenting component 116. Such a pause presenting indicator might result in pausing the media object being presented at, or near, the time the pause presenting indicator is recognized or, alternatively, pausing the media object after the media data received by the device is exhausted.

The device resuming component 122 is configured to resume or initiate a resume of a media object at substantially the same point the media object was interrupted as though no interruption occurred (e.g., without restarting the media object at the beginning). By way of example only, device resuming component 122 might generate and/or communicate a resume presenting indicator, a resume request, or a combination thereof. A resume presenting indicator provides an indication to resume the presentation of the media object. Such a resume presenting indicator might be utilized in embodiments where a resume presenting indicator is communicated to the media presenting component 116, or other component. The resume presenting indicator can include, for example, an indication of the point at which the media object should continue playing.

A resume request refers to a data packet that includes an indication to resume delivery of a media object. As such, the media-playing device can continue receiving a media object, such as a video object or an audio object, so that the media object can be resumed on the media-playing device 110. In one implementation, the resume request might include an indication of the last (i.e., most recent) media data received by the media-playing device 110, an indication of a point at which the media object was interrupted (e.g., packet number of other identifier indicating the last packet received or presented), a resuming instruction, and/or a media object identifier to identify the media object desired to be resumed. A data-loss detecting component 118 that obtains and/or stores the last received packet, or information associated therewith, might provide an indication of the point at which the media object was interrupted.

In embodiments, the device resuming component 122 might be configured to generate and/or communicate a request, such as a resume presenting indicator and/or a resume request, upon detecting an indication to resume a media object. In one embodiment, the completion of a data loss event might provide an indication to initiate the resumption of presenting or receiving a media object. For example, assume the device resuming component 122, or another component, detects a physical connection after a period of a physical disconnection (i.e., the data loss event comprising physical disconnection is completed). In such a case, the device resuming component 122 might automatically, without user intervention, generate and/or communicate a resume request to the streaming control agent 130, the media presenting component 116, or a combination thereof. One skilled in the art will appreciate that a physical connection after a period of a physical disconnection can be detected in any number of ways. For example, a physical connection might be detected upon a successful completion of a communication or signal between the media-playing device and the streaming control agent and/or media server.

In another embodiment, an indication to initiate the resumption of a media object is provided by a user via a user interface. Such a user interface might be automatically presented, or presented upon user request, by the device resuming component 120 upon the completion of a data loss event. In some implementations, the user interface provides a user with an option to resume the currently paused media object. In other implementations, a user may navigate to a media object identifier associated with a media object desired to be resumed. Upon navigating to a desired media object identifier, the user can provide an indication to initiate the resumption of a media object. A user-provided indication to initiate a resumption of a media object might include a user's selection of a media object identifier associated with the media object desired to be resumed. In such a case, a user can select a media object identifier by, for example, double-clicking on a media object identifier, right-clicking on a media object identifier, hovering over a media object identifier, dragging and dropping a media object identifier, providing an audio command, selecting a media object identifier via a touch screen, and the like. For instance, a user may navigate to "Video 1" and provide an indication to resume "Video 1."

Device resuming component 122 might be configured to detect an indication to resume a media object upon attaining a certain threshold and/or parameter. For example, assume that hovering over a media identifier provides an indication to resume the presentation of a media object. In such a case, device resuming component 122 may detect the indication after a media object identifier is hovered over for two seconds. Such threshold and/or parameters can provide a more user-friendly user interface.

The device disconnecting component 124 is configured to disconnect the media-playing device 110 from the streaming control agent 130 and/or media server 150. Such a disconnection refers to ending or closing a media session or delivery of a media object. To disconnect the media-playing device 110, the device disconnecting component 124 might generate and/or communicate a disconnection packet that indicates a disconnection or a request to end a media session. In some cases, a disconnection packet might be generated and communicated upon detecting a user indication that indicates a desire to end a media session. For example, in instances where a user interface is provided to a user to enable the resumption of a media object, rather than selecting to resume the media object, a user might select to discontinue the reception of media data. Alternatively, in some cases, a disconnection packet might be generated and communicated automatically upon the occurrence of an event, such as reception of a last packet associated with a media object or a streaming service session, or a lapse of a time or time period (e.g., a disconnection occurs upon expiration of a specific amount of time). For example, assume a media-playing device 110 is configured to disconnect after the device has been paused for twenty-four hours. In such a case, upon the lapse of the twenty-four hour period, a disconnection packet might be automatically (i.e., without user intervention) generated and communicated to the streaming control agent 130.

The streaming control agent 130 is configured to communicate with media-playing device 110 via the network 170 and to communicate with media server 150 via the network 180. One skilled in the art will appreciate that any number of streaming control agents can be used to communicate with media-playing devices and media servers. For example, a single streaming control agent can provide support for multiple media-playing devices, multiple media servers, or a combination thereof. The streaming control agent 130 services the requests of media-playing device 110 by forwarding requests to other servers, such as media server 150. In embodiments, the streaming control agent 130 enables the resumption of a media object following a data loss event even though the entire media object has not been delivered to the media-playing device. Such a streaming control agent 130 that performs resuming functionality in a streaming media environment, as more fully described below, enables an enhanced user experience following data loss events (e.g., continue media object at point of interruption).

In one embodiment, streaming control agent 130 includes a request communicating component 132, a response communicating component 134, a storage initiating component 136, a media obtaining component 138, an agent data-loss detecting component 140, an agent pausing component 142, an agent resuming component 144, and an agent disconnecting component 146. In some embodiments, one or more of the illustrated components may be implemented as stand-alone applications. In other embodiments, one or more of the illustrated components may be integrated directly into the operating system of the streaming control agent 130. It will be understood by those of ordinary skill in the art that the components illustrated in FIG. 1 are exemplary in nature and in number and should not be construed as limiting. Any number of components may be employed to achieve the desired functionality within the scope of embodiments hereof.

The request communicating component 132 is configured to communicate a media request to a media server, such as media server 150. In one embodiment, the request communicating component 132, or another component, is configured to receive a media request, for example, from the media-playing device 110. For example, upon the media-playing device 110 receiving a user indication to download and/or present a media object, a media initiating component of a media-playing device 110 might generate a media request to be communicated to the streaming control agent 130.

Upon receiving a media request, request communicating component 132 communicates (e.g., forwards) the media request, or a corresponding media request, to an appropriate media server. In embodiments, the request communicating component 132 might be configured to identify an appropriate media server to which to direct the media request, cache the media request, and/or modify the media request (e.g., alter the packet header).

The response communicating component 134 is configured to communicate a media response to a media-player device, such as media-playing device 110. In one embodiment, the response communicating component 134 is configured to receive a media response, for example, communicated from the media server 150, as discussed more fully below. Upon receiving a media response, response communicating component 134 communicates (e.g., forwards) the media response, or a corresponding media response, to an appropriate media-playing device. In embodiments, the response communicating component 134 might be configured to identify an appropriate media-playing device to which to direct the media response, cache the media response, and/or modify the media response (e.g., alter the packet header).

The storage initiating component 136 is configured to initiate data storage for media data received from a media server. That is, the storage initiating component 136 establishes a data storage location for queuing media data received by the streaming control agent 130. Data storage, as used herein, might refer to any type of temporary, momentary, or permanent computer data storage, such as, for example, memory, RAM, optical discs, magnetic storage, portions thereof, or the like. In one embodiment, storage initiating component 136 designates or allocates a buffer (i.e., a portion of memory) as a storage location for received media data to temporarily store data. The size of such a buffer might vary. For example, the size of the buffer might be dynamically based on a time period associated with the media-playing device 110 and/or the streaming control agent 130 (e.g., data-loss time period or connection time period). A buffer can be a FIFO buffer, a LIFO buffer, or the like.

A storage location might be established for media data associated with a particular media object. For example, a first buffer might be initiated for media data associated with a first media object while a second buffer might be initiated for media data associated with a second media object. Alternatively, a storage location might be established for media data associated with multiple media objects.

In one embodiment, storage initiating component 136 initiates a data storage for a media object upon receiving a media request. By way of example only, assume the streaming control agent 130 receives a media request for a particular object. Upon receiving the media request, the streaming control agent 130 might initiate or establish a buffer for media data associated with the media object. As such, when the streaming control agent 130 receives the corresponding media data, such media data is queued within the designated buffer. One skilled in the art will appreciate that initiation of data storage can automatically occur at any time, such as, for example, upon receiving the first media data associated with the media object, before or after communicating the media request to the media server 150, or the like. Further, initiating data storage for media data can occur any number of times (e.g., a single instance for a single media object or multiple media objects, multiple instances for a single media object or multiple media objects, or the like).

The media obtaining component 138 is configured to obtain media data provided by a media server, such as media server 150. In embodiments, the media obtaining component 138 receives media data transmitted from a media server, communicates the received media data to an appropriate media-playing device, and/or directs the received media data to an appropriate storage location (e.g., data storage initiated for the corresponding media object). In some implementations, media data directed to a media-playing device or a storage location might refer to a copy of the media data, the original media data, or information associated therewith. For example, in one embodiment, a copy of the received media data might be generated and directed to an appropriate storage queue within the streaming control agent 130 and, thereafter, the media data received by the streaming control agent 130 might be forwarded on to the appropriate media-playing device. As the storage queue (e.g., a buffer) might be of a particular size, once the storage queue is at capacity, at least a portion of the media data stored in the storage queue can be dequeued (i.e., removed from the queue) to accommodate additional media data.

The agent data-loss detecting component 140 is configured to detect data loss events. Any method can be used to detect data loss events. In one embodiment, the agent data-loss detecting component 140 detects a data loss event if a connection signal is not received, for example, within a particular reception time period. A reception time period, as used herein, refers to any amount of time used in detecting whether a connection signal has been received. A reception time period might be based on a clock time, a time duration, or any other measurement of time. One skilled in the art will appreciate that such a reception time period might correspond with or equal the connection time period used by the media-playing device. In embodiments, a connection signal might not be received, for example, in instances where it is not transmitted from a media-playing device based on a detection of a data loss event or in instances where it is transmitted from a media-playing device but not received by the streaming control agent due to a data loss event.

By way of example only, assume a media-playing device 110 utilizes a connection time period of ten seconds such that a connection signal is transmitted at or upon the lapse of each ten second duration. Further assume that the reception time period used by the streaming control agent 130 equals ten seconds. In such a case, upon the lapse of the ten second reception time period, the streaming control agent 130 detects a data loss event if a connection signal was not received within the ten-second reception time period. That is, the failure of the streaming control agent to receive a connection signal within ten seconds indicates communication issues between the media-playing device 110 and the streaming control agent 130.

The agent pausing component 142 is configured to pause or initiate a pause of the delivery of a media object or media data associated therewith. In embodiments, the agent pausing component 142 automatically pauses or initiates a pause of the delivery of media data in response to a detection of a data loss event. Initiating a pause of delivering media data might occur using a pause delivering indicator. A pause delivering indicator provides an indication to pause the delivery of media data associated with a media object. By way of example only, upon detecting a data loss event, the agent pausing component 142 automatically communicates a pause delivering indicator to the media obtaining component 138 or other application associated with delivering the media data from the streaming control agent 130 to the media-playing device. In some implementations, although the agent pausing component 142 pauses delivery of media data to the media-playing device, the media obtaining component 138 might continue receiving and storing any media packets received from the media server 150.

In some implementations, the agent pausing component 142, or another component, is additionally or alternatively configured to generate and/or communicate a pause request to a media server delivering the media data. A pause request refers to a data packet that includes an indication to pause delivery of a media object. Such a pause request might provide an indication to the media server 150 to pause the delivery of media data to the streaming control agent 130.

The agent resuming component 144 is configured to resume or initiate a resume of delivering a media object at substantially the same point the media object was interrupted as though no interruption occurred (e.g., without restarting the media object at the beginning). By way of example only, agent resuming component 144 might generate and/or communicate a resume delivering indicator, a resume request, or a combination thereof. A resume delivering indicator provides an indication to resume the delivery of media data corresponding with a media object. Such a resume delivering indicator might be utilized in embodiments where a pause delivering indicator is communicated to the media obtaining component 138 or another component. The resume delivering indicator can include, for example, an indication of the point at which the media data should continue delivering.

Alternatively or additionally, the agent resuming component 144 is configured to generate and/or communicate a resume request to an appropriate media server, such as media server 150. A resume request provides an indication to resume delivery of a media object. As such, the streaming control agent can continue receiving media data for delivering to the media-playing device. In one implementation, a resume request might include an indication of the last (i.e., most recent) media data received by the streaming control agent 130, an indication of a point at which the media data delivery was interrupted, a resuming instruction, and/or a media object identifier to identify the media object desired to be resumed. In some embodiments, the agent resuming component 144 might transmit or forward the resume request, or a modification thereof, transmitted by the media-playing device and received by the streaming control agent 130. Alternatively, a new resume request might be generated.

The agent resuming component 144 might be configured to generate and/or communicate a request, such as a resume delivering indicator or a resume request, upon detecting an indication to resume a media object. In one embodiment, the agent resuming component 144 receives a resume request transmitted by a media-playing device that requests resumption of delivering a media object. Such a resume request provides an indication to initiate the resumption of delivering media data and might include an indication of the last packet received by the media-playing device, the next packet for the streaming control agent 130 to send, or the like, so that the agent resuming component 144 can identify the packet at which to begin transmitting to the media-playing device. By way of example only, upon receiving a resume request to resume delivery of the media data, the agent resuming component 144 might automatically, without use intervention, generate and/or communicate a resume delivering indicator to a media obtaining component 138, a resume request to a media server 150, or a combination thereof. In addition, upon receiving a resume request from a media-playing device, the agent resuming component 144 can be configured to dequeue or initiate a dequeue of stored media data. For example, a dequeue or initiation thereof might begin with the media data packet identifier that matches the packet identifier indicated in the media resume request. One skilled in the art will appreciate that the agent resuming component 144 might resume or initiate a resume in response to other events, such as the streaming control agent 130 detecting the completion of a data loss event.

The agent disconnecting component 146 is configured to disconnect the streaming control agent 130 from a media server, such as media server 150 and/or media-playing device, such as media-playing device 110. To disconnect a media server, the agent disconnecting component 146 might generate and/or communicate a disconnection packet that indicates a disconnection or a request to disconnect a media session. In some cases, a disconnection packet might be generated and/or communicated upon detecting an indication to end a media service or upon detecting the last packet arrival at the streaming control agent to end the media session. For example, in instances where a user interface is provided to a user to enable the resumption of a media object, rather than selecting to resume the media object, a user might select to discontinue the reception of media data. In such a case, a disconnection packet might be communicated upon the streaming control agent 130 receiving an indication to discontinue a media session. Alternatively, in some cases, a disconnection packet might be generated and communicated upon the occurrence of an event, such as reception of a last packet associated with a media object or a lapse of a time or time period (e.g., a disconnection occurred for a specific amount of time). For example, assume a media-playing device 110 is configured to disconnect after the device has been paused for twenty-four hours. In such a case, upon the lapse of the twenty-four hour period, a disconnection packet might be generated and communicated to the streaming control agent 130.

The media server 150 is configured to communicate media data. In one embodiment, the media server includes a request receiving component 152, a media providing component 154, a media pausing component 156, a media resuming component 158, and a media disconnecting component 160. The request receiving component 152 is configured to receive a media request. In embodiments, the streaming control agent 130 communicates the media request to the media server 150. In one implementation, the request receiving component 152, or other component, is configured to provide a media response indicating that the media request was received.

The media providing component 154 is configured to provide media data. Such a media providing component 154 can provide media data in response to the media request. In embodiments, the media providing component 154 might reference, extract, or retrieve media data associated with the media object requested. Such media data might be stored in a data store residing within the media server 150 or remote from the media server 150.

The media pausing component 156 is configured to pause or initiate a pause of the delivery of a media object, or media data associated therewith. In embodiments, the media pausing component 156 automatically pauses or initiates a pause of the delivery of the media data in response to receiving a pause request from a streaming control agent. Initiating a pause of delivering the media object might occur using a pause delivering indicator. By way of example only, upon receiving a pause request from a streaming control agent, the media pausing component 156 automatically communicates a pause delivering indicator to the media providing component 154 or other application associated with delivering the media data from the media server 150 to the streaming control agent.

The media resuming component 158 is configured to resume or initiate a resume of delivering a media object at substantially the same point the media object was interrupted as though no interruption occurred (e.g., without restarting the media object at the beginning). The media resuming component 158 might communicate or request another component, such as media providing component 154, to communicate media data to a streaming control agent. In embodiments, the media resuming component 158 receives a resume request transmitted by a streaming control agent that requests resumption of delivering a media object. Such a resume request might include an indication of the last packet received by the media-playing device, the next packet for the media server 150 to send, or the like, so that the media resuming component 158 can identify the packet at which to begin transmitting to the streaming control agent. By way of example only, upon receiving a resume request to resume delivery of the media data, the media resuming component 158 can provide a resume delivering indicator to media providing component 154, or other component, to resume the transmission of media data associated with a media object. As such, the media providing component 154 can begin transmitting media data in accordance with the media data packet identifier that matches the packet identifier indicated in the media resume request. One skilled in the art will appreciate that the agent resuming component 144 might resume or initiate a resume in response to other events, such as the media server 150 detecting the completion of a data loss event.

The media disconnecting component 160 is configured to disconnect the media server 150 from the streaming control agent 130. To disconnect a media server, the agent disconnecting component 146 might generate and/or communicate a disconnection packet that indicates a disconnection or a request to disconnect a media session. In some cases, a disconnection packet might be generated and/or communicated upon detecting an indication to end a media service or upon detecting communication of the last packet of the media object. For example, in instances where a user interface is provided to a user to enable the resumption of a media object, rather than selecting to resume the media object, a user might select to discontinue the reception of media data. In such a case, a disconnection packet might be communicated upon the media server 150 receiving an indication to discontinue a media session.

Alternatively, in some cases, a disconnection packet might be generated and communicated upon the occurrence of an event, such as communication of a last packet associated with a media object or a lapse of a time or time period (e.g., a disconnection occurred for a specific amount of time). For example, assume a media server 150 has transmitted the final media data corresponding with a particular media object or a media request. In such a case, upon the transmission of the final media data, a disconnection packet might be generated and communicated to the streaming control agent 130 or the media disconnecting component 160 might provide the streaming control agent 130 with an indication that the last media data associated with the desired media object has been transmitted such that the streaming control agent initiates a disconnection.

One skilled in the art will appreciate that the components discussed herein are only illustrative of exemplary implementations. For example, in some embodiments, the storage initiating component 136 is not required due to a default storage location that is utilized to store media data. By way of further example, the device pausing component 120 is not necessary. Rather, the media-playing device 110 might present the media data received by the device until there is no remaining media data to present.

Figure 2:
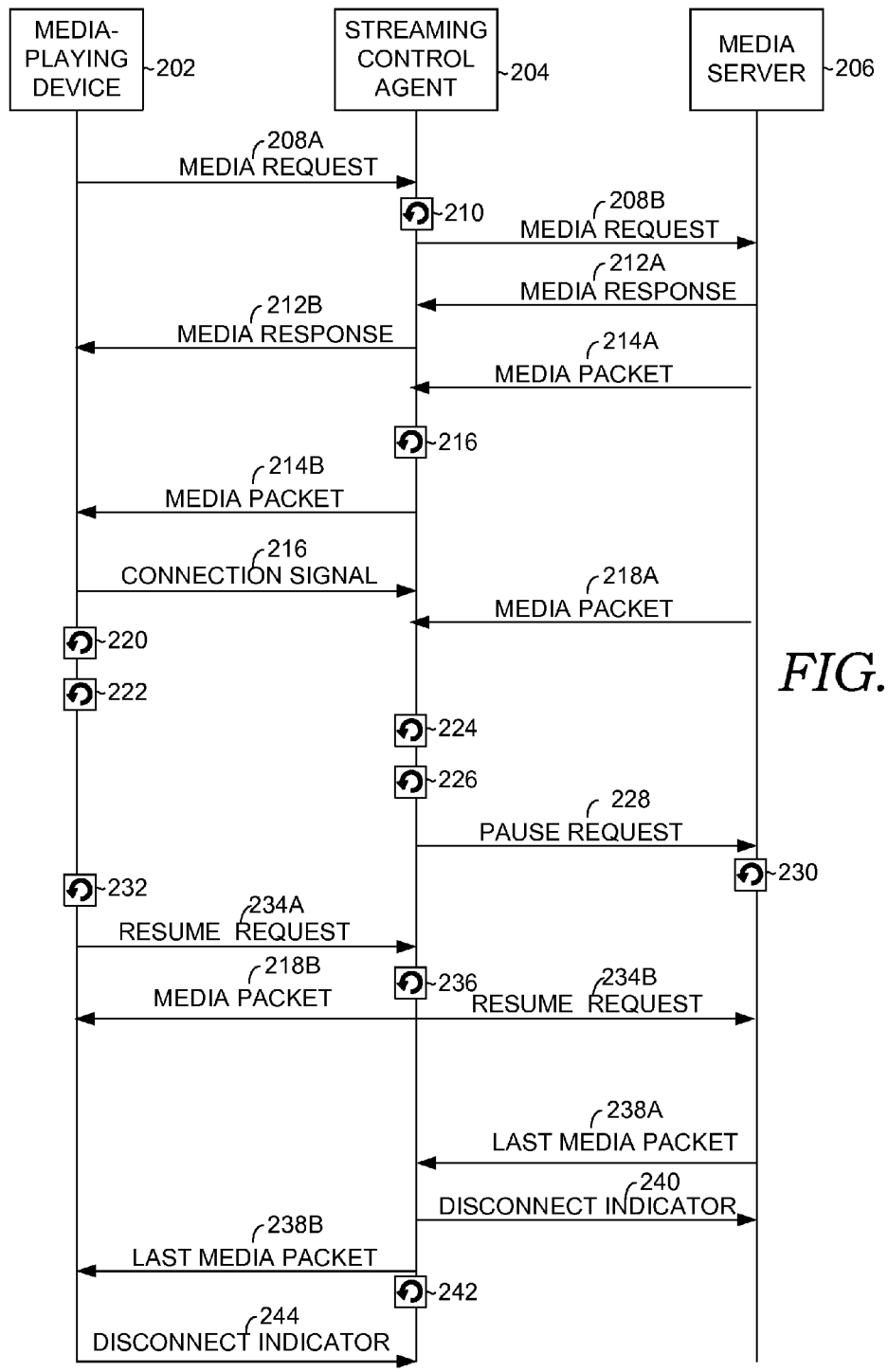
FIG. 2 is an exemplary flow diagram illustrating an exemplary method for resuming a media object presented on a device following a data loss event, in accordance with an embodiment of the present invention.

By way of example only, and with reference to FIG. 2, an exemplary flow chart illustrating a method for resuming a media object upon a data loss event is shown. Initially, a media request 208a is communicated from a media-playing device 202 to a streaming control agent 204. Upon receipt of media request 208a, streaming control agent 204 initiates a storage queue within the streaming control agent 204 for storing media data. The streaming control agent 204 communicates media request 208b to a media server 206. In response, the media server 206 communicates a media response 212a to streaming control agent 204, which, in turn, communicates media response 212b to media-playing device 202. Media server 206 communicates media packet 214a having media data to streaming control agent 204. The streaming control agent 204 stores a copy of the media packet 214a or a portion thereof, as indicated at block 216, and communicates media packet 214b to media-playing device 202. In accordance with an expiration of a connection time period, media-playing device 202 transmits a connection signal 216 to streaming control agent 204.

Media server 206 communicates media data 216a having media data associated with a media object to streaming control agent 204. Assume that prior to media-playing device 202 communicating a second connection signal to streaming control agent 204, the media-playing device 202 detects a data loss event at block 220. Because a data loss event is detected, the media-playing device 202 does not transmit a second connection signal to the streaming control agent 204 upon the lapse of the connection time period. In embodiments, data loss events are detected when media data is not received within a particular time period. At block 222, the media-playing device 202 pauses the presentation of the media object. As the streaming control agent 204 does not receive a connection signal from the media-playing device within a particular time period, streaming control agent 204 recognizes a data loss event, as indicated at block 224.

In response to detecting the data loss event, the streaming control agent 204 pauses delivery of media data to the media-playing device 202 such that media packet 218a is not delivered to the media-playing device 202, as indicated at block 226, and communicates a pause request 228 to the media server 206. The pause request provides an indication to pause delivery of media data. At block 230, the media server 206 receives the pause request 228 and pauses delivery of media data to the streaming control agent 204.

At block 232, the media-playing device 202 recognizes that the data loss event has concluded (e.g., a connection is reestablished) and resumes the presentation of the media object. The media-playing device 202 communicates a resume request 234a to the streaming control agent 204. The resume request 234a can be automatically provided or provided based on a user indication. Subsequently, the streaming control agent 204 recognizes the resume request 234a and resumes delivery of media data, as indicated at block 236. Accordingly, media packet 218b is communicated to media-playing device 202. In addition, in response to the resume request 234a, the streaming control agent 204 communicates a resume request 234b to media server 206.

A last media packet 238a containing media data is transmitted from the media server 206 to the streaming control agent 204. The streaming control agent 204 communicates a disconnect indicator 240 to the media server 206 and communicates last media packet 238b to media-playing device 202. At block 242, the streaming control agent 204 dequeues the storage of media data associated with a media object to release the resource. After the media playing device 202 receives the last media packet 238b, the media playing device 202 communicates a disconnect indicator 244 to the streaming control agent 204 to end the media session.

Figure 3:
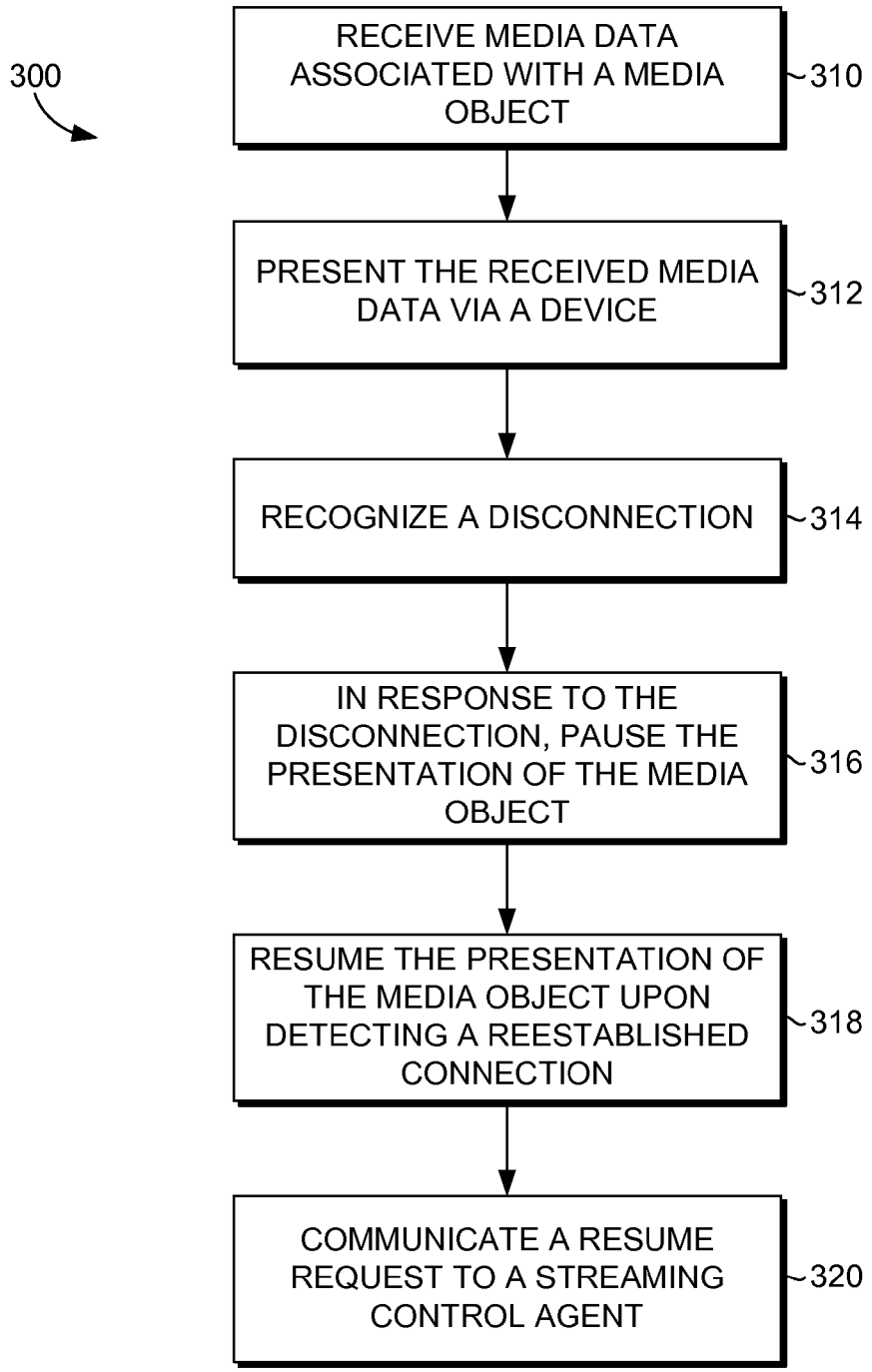
FIG. 3 illustrates a method for resuming a presentation of a media object being presented on a device, in accordance with an embodiment of the present invention.

Referring now to FIG. 3, an exemplary method 300 for resuming a presentation of a media object being presented on a device. Initially, as indicated at block 310, media data associated with a media object is received. Subsequently, the received media data is presented on a device at block 312. At block 314, a disconnection is recognized. The disconnection occurs at a point during the presentation of the media object. In some embodiments, the disconnection is recognized when media data is not received with a predetermined amount of time. In response to the disconnection, the presentation of the media object is paused. This occurs at block 316. Upon detecting a reestablished connection, as indicated at block 318, the presentation of the media object is resumed such that the media object continues at substantially the same point at which the media object was interrupted as though no interruption occurred. At block 320, a resume request is communicated to the streaming control agent. The resume request might include an indication of the media data at which to begin delivery.

Figure 4:
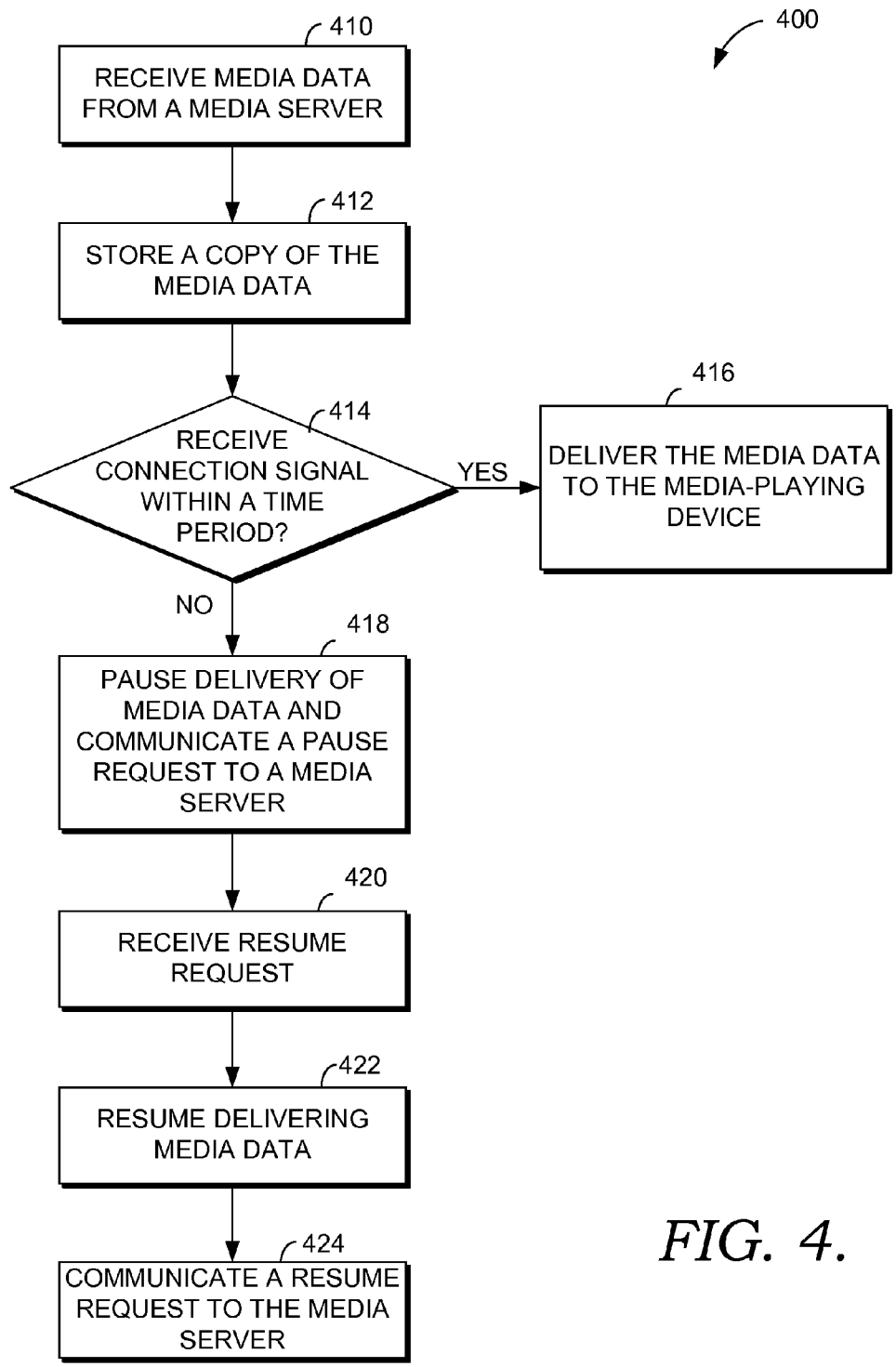
FIG. 4 illustrates a method, according to an embodiment of the present invention, for resuming delivery of a media object to a media-playing device upon a data loss event.

With reference to FIG. 4, in accordance with an embodiment of the present invention, an exemplary method 400 for resuming delivery of a media object to a media-playing device upon a data loss event is illustrated. Initially, as indicated at block 410, a streaming control agent receives media data from a media server. Thereafter, at block 412, a copy of the media data is stored within a storage queue of the streaming control agent. At block 414, it is determined if a connection signal has been received from a media-playing device within a particular time period. If a connection signal has been received from the media-playing device within the particular period of time, the streaming control agent delivers the media data to the media-playing device. This is indicated at block 416. If, on the other hand, a connection signal has not been received within the particular time period, the streaming control agent pauses delivery of media data to the media-playing device and communicates a pause request to a media server at block 418. The pause request provides an indication to the media server to pause the delivery of media data to the streaming control agent. At block 420, a resume request is received. The resume request might include an indication of the media data for which delivery should resume. In response, delivering media data to the media-playing device is resumed at block 422. At block 424, a resume request is communicated to the media server to resume the delivery of media data from the media server to the streaming control agent.

Figure 5:
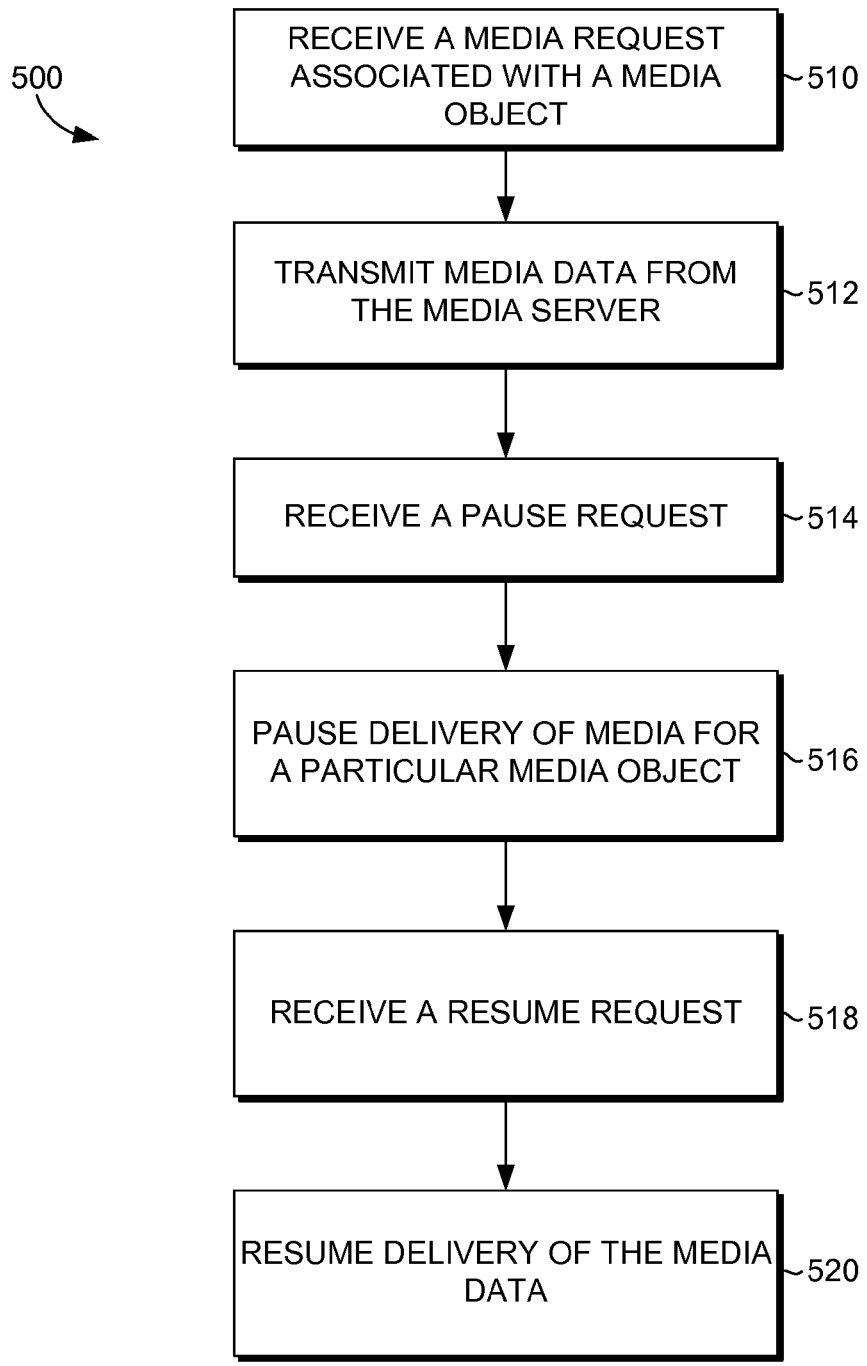
FIG. 5 illustrates a method for resuming delivery of a media object to a streaming control agent, in accordance with an embodiment of the present invention.

Turning now to FIG. 5, in accordance with an embodiment of the present invention, an exemplary method 500 for resuming delivery of a media object to a streaming control agent is illustrated. Initially, at block 510, a media request associated with a media object is received from a streaming control agent. Subsequently, at block 512, media data is transmitted from the media server to the streaming control agent. At block 514, a pause request requesting the media server to pause delivery of such media data is received. Accordingly, at block 516, delivery of media data for a particular media object is paused. Thereafter, a resume request to resume delivery of the media data is received at block 518. The resume request might include an indication of the media data for which delivery should resume. At block 520, delivery of the media data is resumed.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. One or more non-transitory computer-readable media having computer-executable instructions embodied thereon that, when executed, perform a method for resuming a media object presented on a media-playing device following a data loss event that interrupts the presentation of the media object, wherein a first portion of media data associated with the media object has been delivered to a device via a streaming service, the method comprising:

presenting the media object on the media-playing device using the first portion of media data received by the media-playing device;

transmitting a periodic connection signal from the media-playing device to a streaming control agent upon each lapse of a connection time period while the media-playing device is physically connected to the streaming control agent, wherein the periodic connection signal indicates the media-playing device is properly functioning and is physically connected to the streaming control agent;

at the media-playing device, recognizing a physical disconnection that occurs at a point during the presentation of the media object, the physical disconnection interrupting the presentation of the media object, wherein the physical disconnection is recognized at the media-playing device based on an identification that a second portion of media data associated with the media object has not been received by the media-playing device within a predetermined time period;

based on the recognition of the physical disconnection,
(1) automatically pausing the presentation of the media object, and
(2) discontinuing the transmitting of the periodic connection signal;
resuming the presentation of the media object on the media-playing device at substantially the same point the media object was interrupted as though no interruption occurred upon recognition of a reestablishment of a physical connection; and
communicating a resume request from the media-playing device to the streaming control agent that is remote from the media-playing device and a media server, wherein the streaming control agent communicates with the media server to initiate resumption of delivering the media object from the media server to the streaming control agent, the resume request including an indication of the second portion of media data at which the streaming control agent should begin delivering the media data to the media-playing device.

2. The one or more computer-readable media of claim 1, wherein the media object comprises an audio media object, a video media object, or a combination thereof.

3. The one or more computer-readable media of claim 1 further comprising presenting an option to resume the presentation of the media object at the interrupted point.

4. The one or more computer-readable media of claim 1 further comprising detecting an indication to resume the presentation of the media object.

5. The one or more computer-readable media of claim 1 further comprising receiving the second portion of media data associated with the media object from the streaming control agent in response to the resume request.

6. The one or more computer-readable media of claim 1, wherein the presentation of the media object is paused using a pause presenting indicator that provides an indication to pause the presentation of the media object.

7. The one or more computer-readable media of claim 1 further comprising receiving the first portion of media data and temporarily storing the received first portion of media data in memory of the media-playing device until the first portion of media data is presented via the device.

8. One or more non-transitory computer-readable media having computer-executable instructions embodied thereon that, when executed, perform a method for resuming a media object presented on a portable device following a data loss event that interrupts the presentation of the media object, wherein a portion of the media object has been delivered to the portable device from a streaming control agent via a streaming service, the method comprising:
at a streaming control agent, recognizing that a periodic connection signal is received from the portable device, the periodic connection signal transmitted from the portable device to the streaming control agent upon each lapse of a predetermined time period while communication means exist between the portable device and the streaming control agent, wherein the periodic connection signal is a specific signal generated by the portable device to indicate that the communication means exist between the portable device and the streaming control agent;
based on the recognition that the periodic connection signal is received from the portable device, delivering a first media data associated with the media object to the portable device, a copy of the first media data being stored in a storage queue of a streaming control agent;
at the streaming control agent, recognizing that the periodic connection signal is not received from the portable device within a subsequent occurrence of the predetermined time period;
based on the periodic connection signal not being received at the streaming control agent within the subsequent occurrence of the predetermined time period, pausing delivery of the media object to the portable device that is remote from the streaming control agent and initiating a pause of delivery of the media object from a media server to the streaming control agent, the media server being remote from the streaming control agent and the portable device, wherein the streaming control agent provides support for a plurality of portable devices;
recognizing an indication to resume delivery of the media object to the portable device; and
communicating a second media data associated with the media object to the portable device, a copy of the second media data being stored in the storage queue of the streaming control agent.

9. The one or more computer-readable media of claim 8, wherein the media object comprises a video media object, an audio media object, or a combination thereof.

10. The one or more computer-readable media of claim 8 further comprising receiving the first media data from the media server.

11. The one or more computer-readable media of claim 10 further comprising:
generating a copy of the first media data; and
storing the copy of the first media data in the storage queue of the streaming control agent.

12. The one or more computer-readable media of claim 11, wherein the streaming control agent is remote from the portable device and the media server.

13. The one or more computer-readable media of claim 8, receiving the indication to resume delivery of the media object to the portable device.

14. The one or more computer-readable media of claim 13, wherein the indication to resume delivery of the media object comprises a request to resume the media object at the point at which it was interrupted, wherein the request is communicated from the portable device upon recognizing a completion of a data loss event.

15. The one or more computer-readable media of claim 14 further comprising dequeuing the first media data and the second media data from the storage queue of the streaming control agent.

16. The one or more computer-readable media of claim 8 further comprising communicating a request to pause delivery of the media object from the media server to the streaming control agent.

17. A method for resuming a media object presented on a wireless device following a data loss event that interrupts the presentation of the media object, wherein a portion of the media object has been delivered to a wireless device via a streaming service from a streaming control agent, the method comprising:
at the streaming control agent, receiving from a media server via a first network a first set of one or more media packets containing media data associated with the media object;
communicating the first set of one or more media packets from the streaming control agent to the wireless device via a second network;

recognizing a failed connection between the wireless device and the streaming control agent, wherein the failed connection is recognized at the streaming control agent upon the lapse of a predetermined time period during which a periodic connection signal transmitted from the wireless device while communication means exist between the wireless device and the streaming control agent is not received by the streaming control agent, wherein the periodic connection signal is a signal communicated by a data-loss detecting component of the wireless device to the streaming control agent to indicate to the streaming control agent that the communication means exist between the wireless device and the streaming control agent;

based on the recognized connection failure,
(1) pausing delivery of a second set of one or more media packets containing media data associated with the media object, the second set of one or more media packets received from the media server, wherein the second set of one or more media packets, or a portion thereof, is stored within a storage queue of the streaming control agent, and (2) communicating a request to pause delivery of the media object from the media server to the streaming control agent, the media server being remote from the streaming control agent;

receiving an indication that a connection between the wireless device and the streaming control agent has been reestablished, wherein the indication of the established connection comprises a resume request communicated by the wireless device in accordance with a user selection to resume the media object; and based on the indication of the established connection, communicating the second set of the one or more media packets to the device.

18. The method of claim 17 further comprising establishing the storage queue of the streaming control agent upon receiving a media request from the wireless device indicating a desire to receive the media object.

19. The method of claim 17, wherein the streaming control agent provides support for a plurality of user devices.

20. The method of claim 17, wherein the streaming control agent utilizes a physically wired network to communicate with the media server.

* * * * *